US008774523B2

(12) United States Patent
Euler

(10) Patent No.: US 8,774,523 B2
(45) Date of Patent: Jul. 8, 2014

(54) PRECISE BOUNDARY SEGMENT INTERSECTION FOR BOUNDARY REPRESENTATION MODELING

(75) Inventor: Nicolas Euler, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 936 days.

(21) Appl. No.: 12/510,720

(22) Filed: Jul. 28, 2009

(65) Prior Publication Data

US 2011/0026826 A1    Feb. 3, 2011

(51) Int. Cl.
*G06K 9/48* (2006.01)
*G06K 9/00* (2006.01)

(52) U.S. Cl.
USPC ........................................ 382/199; 382/100

(58) Field of Classification Search
None
See application file for complete search history.

(56) References Cited

U.S. PATENT DOCUMENTS

| | | | |
|---|---|---|---|
| 4,736,306 A | 4/1988 | Christensen | |
| 4,821,214 A | 4/1989 | Sederberg | |
| 5,278,983 A | 1/1994 | Kawabe | |
| 5,377,118 A | 12/1994 | Leon | |
| 5,379,225 A | 1/1995 | Tazawa | |
| 5,416,729 A | 5/1995 | Leon | |
| 5,537,519 A | 7/1996 | Vossler | |
| 6,236,411 B1 * | 5/2001 | Nikom | 345/443 |
| 6,256,603 B1 * | 7/2001 | Celniker | 703/10 |
| 6,392,645 B1 | 5/2002 | Han | |
| 6,424,918 B1 | 7/2002 | Jorgensen | |
| 7,075,532 B2 * | 7/2006 | Mukherjee et al. | 345/423 |
| 7,092,859 B2 | 8/2006 | Wang | |
| 7,209,136 B2 | 4/2007 | Grau | |
| 7,277,835 B2 | 10/2007 | Spitz | |
| 8,248,408 B2 * | 8/2012 | Chang et al. | 345/420 |
| 2008/0118118 A1 * | 5/2008 | Berger | 382/128 |
| 2009/0135181 A1 | 5/2009 | Chang et al. | |

OTHER PUBLICATIONS

Ronfard et al., "Full-range approximation of triangulated polyhedra", Eurographics '96, vol. 15, No. 3, pp. 1-10.*
Egenhofer, Max J. "A formal definition of binary topological relationships." Foundations of data organization and algorithms. Springer Berlin Heidelberg, 1989. 457-472.*
Jackson, David J. "Boundary representation modelling with local tolerances." Proceedings of the third ACM symposium on Solid modeling and applications. ACM, 1995.*
Clementini, E., and P. Di Felice. "Approximate Topological Relations." International Journal of Approximate Reasoning 16.2 (1997): 173-204.*
Herkommer, et al., "Minimizing misties in seismic data", Computers & Geosciences, vol. 20, No. 5, Jun. 1994, pp. 767-795.
Examiner's Report issued for Canadian Patent Application No. 2,709,040 mailed on Nov. 13, 2012, 4 pages.

(Continued)

*Primary Examiner* — Thomas Conway
(74) *Attorney, Agent, or Firm* — Colin L. Wier; Rodney Warfford; Lam Nguyen

(57) ABSTRACT

Precise boundary segment intersection methods and systems for boundary representation are described. For example, in one embodiment, a method includes computing a plurality of intersections of a plurality of segments, computing an uncertainty associated with each intersection of the plurality of intersections, and determining whether to aggregate at least one of the plurality of intersections with another of the plurality of intersections based on one or more of the determined uncertainties. In another embodiment, the method may further include determining whether to consolidate at least one non-aggregated intersection with at least one other intersection based on a topological consistency requirement.

12 Claims, 5 Drawing Sheets

(56) References Cited

OTHER PUBLICATIONS

"Standard for Binary Floating-Point Arithmetic", ANSI-IEEE Std 754-1985, 1985; 20 pages.
Chazelle, et al., "Application challenges to computational geometry: CG impact task force report", Technical report TR-521-96, Princeton University, Apr. 1996; 57 pages.
Combined Search and Examination Report issued in GB 1012233.1 on Nov. 9, 2010; 6 pages.
Examination Report issued in GB 1012233.1 on Nov. 22, 2011; 3 pages.
Hoffmann, et al., "Geometric and Solid Modeling: An Introduction", Morgan Kaufmann Publishing, 1989, 57 pages.
Karasick, et al., "Efficient Delauney triangulations using rational arithmetic", ACM Transactions on Graphics, vol. 10, Issue 1, 1991, pp. 71-91.
Keyser, et al., "Efficient B-Rep generation of low degree sculptured solids using exact arithmetic", University of North Carolina, Department of Computer Science, 1999, 35 pages.
Mantyla, M., "Geometric and Solid Modeling: An Introduction", Computer Science Press, 1988, 27 pages.
Requicha, Aristides, "Representations for Rigid Solids: Theory, Methods and Systems", ACM Computing Surveys, Dec. 1980, pp. 437-464.
Shewchuk, Jonathan, "Adaptive Precision Floating-Point Arithmetic and Fast Robust Geometric Predicates", Technical Report CMU-CS-96-140, School of Computer Science, Carnegie Mellon University, Pittsburgh, Pennsylvania, 1996, 57 pages.
Shewchuk, Jonathan, "Adaptive Precision Floating-Point Arithmetic and Fast Robust Geometric Predicates", Discrete and Computational Geometry, vol. 18, 1997, pp. 305-363.

* cited by examiner

PRECISE BOUNDARY SEGMENT INTERSECTION FOR BOUNDARY REPRESENTATION MODELING

BACKGROUND

Computational models, such as those used in modeling geological formations for depth imaging analyses, may need to accurately account for thin singularities, such as salt overhangs, thin lithology beds, down-lap, off-lap, and other phenomena. In general, conventional modeling methods may involve partitioning a space using various surfaces (e.g. horizons, faults, geobodies, etc.) into volumes, and then filling those volumes with various properties (e.g. velocities). In the Computer-Aided Design (CAD) domain, this approach is known as volume or solid modeling and can be achieved by different technologies, including those involving constructive solid geometry, boundary representation, cellular partitioning, and other suitable approaches. Boundary representation models are based on volumes being represented by their frontiers or boundaries, and thus generally rely on mathematical concepts introduced by Requicha (e.g. *Representations for Rigid Solids: Theory, Methods and Systems*, by Aristides A. G. Requicha, ACM Computing Surveys, December 1980), Mantyla (e.g. *Geometric and Solid Modeling: An Introduction*, by M. Mantyla, Computer Science Press, 1988), and Hoffman (e.g. *Geometric and Solid Modeling: An Introduction*, by Christopher M. Hoffman, Morgan Kaufmann, 1989).

The intensive geometrical computations involved in boundary representation modeling depend on the floating point precision of the computer (i.e. round-offs). When performing any mathematical operations such as addition, subtraction, dot product, arithmetic truncations, overflow or underflow, it is possible that the result may require more digits than the variable can hold, leading to a truncation of significant digits. Such truncations may lead to incorrect or inaccurate results that violate the topological consistency of the model. Methods that mitigate the undesirable effects of such truncations may therefore have considerable utility.

SUMMARY

Techniques for precise boundary segment intersection for boundary representation models are disclosed. In one embodiment, a method includes computing a plurality of intersections of a plurality of segments, computing an uncertainty associated with each intersection of the plurality of intersections, and determining whether to aggregate at least one of the plurality of intersections with another of the plurality of intersections based on one or more of the determined uncertainties. In another embodiment, the method may further include determining whether to consolidate at least one non-aggregated intersection with at least one other intersection based on a topological consistency requirement. Further aspects of methods and systems in accordance with the teachings of the present disclosure are described more fully below.

BRIEF DESCRIPTION OF THE DRAWINGS

Various embodiments and aspects of the present disclosure may be described below with reference to the accompanying figures, in which the same or similar reference numbers may be used to reference like features and components.

DETAILED DESCRIPTION

Figure 1:
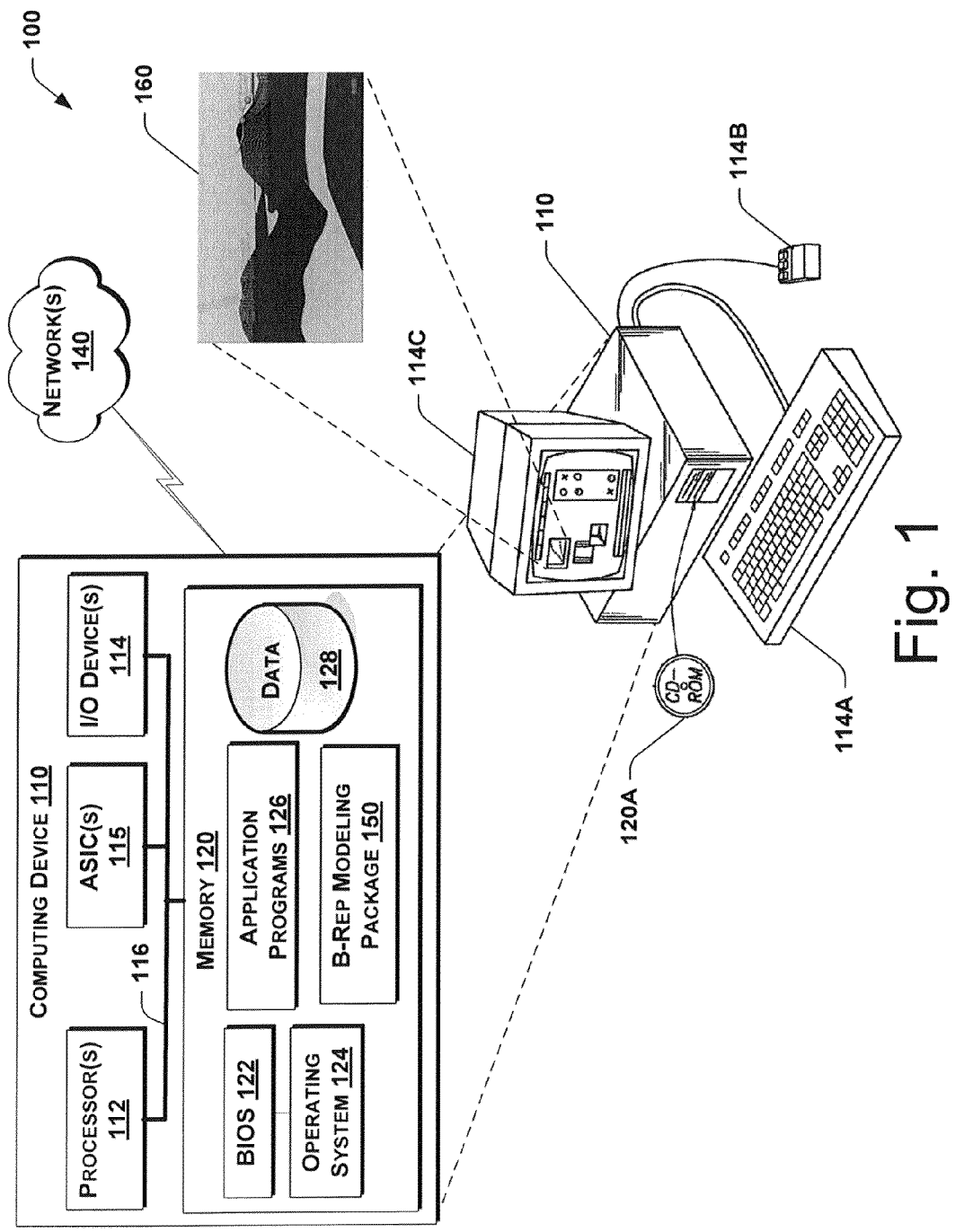
FIG. 1 illustrates an exemplary environment in which various embodiments of methods and systems in accordance with the teachings of the present disclosure can be implemented.

This disclosure is directed to methods and systems for precise boundary segment intersection for boundary representation models. In general, implementations of methods and systems in accordance with the teachings of the present disclosure may advantageously enable the computation of boundary segment intersections for a boundary representation (or "b-rep") model construction in a consistent topological manner, and also enable the representation of these intersections as a machine-representable point by integrating the impact of numerical instabilities into an uncertainty sphere combined with the use of topological information and geometrical predicates. By enforcing the topological consistency and honoring the relevant mathematical clauses described below, the integrity of the boundary representation model is preserved.

Basically, the three mathematical clauses that are intended to be honored in accordance with the teachings of the present disclosure are as follows:

The "orientation clause": Surfaces that bound a volume should be oriented and closed in order to distinguish what is inside from outside of the volume.

The "non-intersection clause": Volumes should not intersect except along their boundary (faces). Faces should not intersect except along their borders (curves). Curves should not intersect except along their extremities (nodes), and nodes should be distinct and unique in space.

The "finitude clause": Nodes should have a unique and finite position in space. Curves should have a finite length, faces should have a finite area, and closed volumes should have a finite volume.

If at any time, any of these three clauses are not honored, then topological consistency of the model is considered to be broken, implying leaking volumes, missing regions (e.g. incorrect choices being made regarding the connectivity of the curves), or other undesirable results may occur. As a consequence, such a broken model should not be used for further processing (e.g. sub-salt imaging, tomography, etc.). It is important for a variety of disciplines (e.g. depth imaging) to build models in a reliable manner that honor the three above-referenced clauses.

As noted above, one of the challenges faced by methods and systems for determining boundary segment intersections for boundary representation modeling is the uncertainties introduced by truncation errors, including those attributable to the floating point precision limitations. For example, in programming language, when performing a mathematical operation (e.g. adding two numbers), it is possible that the result requires more digits than the variable can hold, leading to a truncation of significant digits. Methods and systems in accordance with the teachings of the present disclosure may at least partially mitigate these undesirable effects.

In the following disclosure, one or more exemplary environments are described in which embodiments in accordance with the teachings of the present disclosure may be implemented. Following the description of exemplary environments, details of specific embodiments of methods and systems in accordance with the teachings of the present disclosure are provided.

Exemplary Environments

Systems and methods for precise boundary segment intersection for boundary representation models in accordance with the teachings of the present disclosure may be implemented in a variety of computational environments. For example, FIG. 1 illustrates an exemplary environment 100 in which various embodiments of systems and methods in accordance with the teachings of the present disclosure can be implemented. In this implementation, the environment 100 includes a computing device 110 configured in accordance with the teachings of the present disclosure. In some embodiments, the computing device 110 may include one or more processors 112 and one or more input/output (I/O) devices 114 coupled to a memory 120 by a bus 116. One or more Application Specific Integrated Circuits (ASICs) 115 may be coupled to the bus 116 and configured to perform one or more desired functionalities described herein.

The one or more processors 112 may be composed of any suitable combination of hardware, software, or firmware to provide the desired functionality described herein. Similarly, the I/O devices 114 may include any suitable I/O devices, including, for example, a keyboard 114A, a cursor control device (e.g. mouse 114B), a display device (or monitor) 114C, a microphone, a scanner, a speaker, a printer, a network card, or any other suitable I/O device. In some embodiments, one or more of the I/O components 114 may be configured to operatively communicate with one or more external networks 140, such as a cellular telephone network, a satellite network, an information network (e.g. Internet, intranet, cellular network, cable network, fiber optic network, LAN, WAN, etc.), an infrared or radio wave communication network, or any other suitable network. The system bus 116 of the computing device 110 may represent any of the several types of bus structures (or combinations of bus structures), including a memory bus or memory controller, a peripheral bus, an accelerated graphics port, and a processor or local bus using any of a variety of bus architectures.

The memory 120 may include one or more computer-readable media configured to store data and/or program modules for implementing the techniques disclosed herein. For example, the memory 120 may host (or store) a basic input/output system (BIOS) 122, an operating system 124, one or more application programs 126, and program data 128 that can be accessed by the processor 112 for performing various functions disclosed herein.

The computing device 110 may further include a boundary representation modeling package 150 in accordance with the teachings of the present disclosure. The boundary representation modeling package 150 may be a package that is configured to perform computational modeling of objects using boundary representation (e.g. such as a computer-aided design (CAD) package), or may be more broadly configured to perform a wider variety of predictions or simulations (e.g. sub-surface imaging, tomography, fluid flow, robotics, computer-aided engineering (CAE) packages, etc.) that may be based on one or more boundary representation models. Operational aspects of the boundary representation modeling package 150 in accordance with the teachings of the present disclosure are described more fully below.

As depicted in FIG. 1, the boundary representation modeling package 150 may be stored within (or hosted by) the memory 120. In alternate implementations, however, the boundary representation modeling package 150 may reside within or be distributed among one or more other components or portions of the computing device 110. For example, in some implementations, one or more aspects of the boundary representation modeling functionality described herein may reside in one or more of the processors 112, the I/O devices 114, the ASICs 115, or the memory 120 (e.g. one or more application programs 126).

In the following description, various techniques may be described in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media".

"Computer storage media" include volatile and non-volatile, removable and non-removable media implemented in any method or technology for storage of information such as computer readable instructions, data structures, program modules, or other data. Computer storage media may include, but is not limited to, random access memory (RAM), read only memory (ROM), electrically erasable programmable ROM (EEPROM), flash memory or other memory technology, compact disk ROM (CD-ROM), digital versatile disks (DVD) or other optical disk storage, magnetic cassettes, magnetic tape, magnetic disk storage or other magnetic storage devices, or any other medium, including paper, punch cards and the like, which can be used to store the desired information and which can be accessed by the computing device 110. Combinations of any of the above should also be included within the scope of computer readable media.

Moreover, the computer-readable media included in the system memory 120 can be any available media that can be accessed by the computing device 110, including removable computer storage media (e.g. CD-ROM 120A) or non-removeable storage media. Computer storage media may include both volatile and nonvolatile media (or persistent and non-persistent) implemented in any method or technology for storage of information such as computer-readable instructions, data structures, program modules, or other data. Generally, program modules executed on the computing device 110 may include routines, programs, objects, components, data structures, etc., for performing particular tasks or implementing particular abstract data types. These program modules and the like may be executed as a native code or may be downloaded and executed such as in a virtual machine or other just-in-time compilation execution environments. Typically, the functionality of the program modules may be combined or distributed as desired in various implementations.

Referring again to FIG. 1, it will be appreciated that the computing device 110 is merely exemplary, and represents only one example of many possible environments (e.g. computing devices, architectures, etc.) that are suitable for use in accordance with the teachings of the present disclosure. Therefore, the computing device 110 shown in FIG. 1 is not intended to suggest any limitation as to scope of use or functionality of the computing device and/or its possible architectures. Neither should computing device 110 be interpreted as having any dependency or requirement relating to any one or combination of components illustrated in the example computing device 110.

Exemplary Processes for Boundary Segment Intersection

Figure 2:
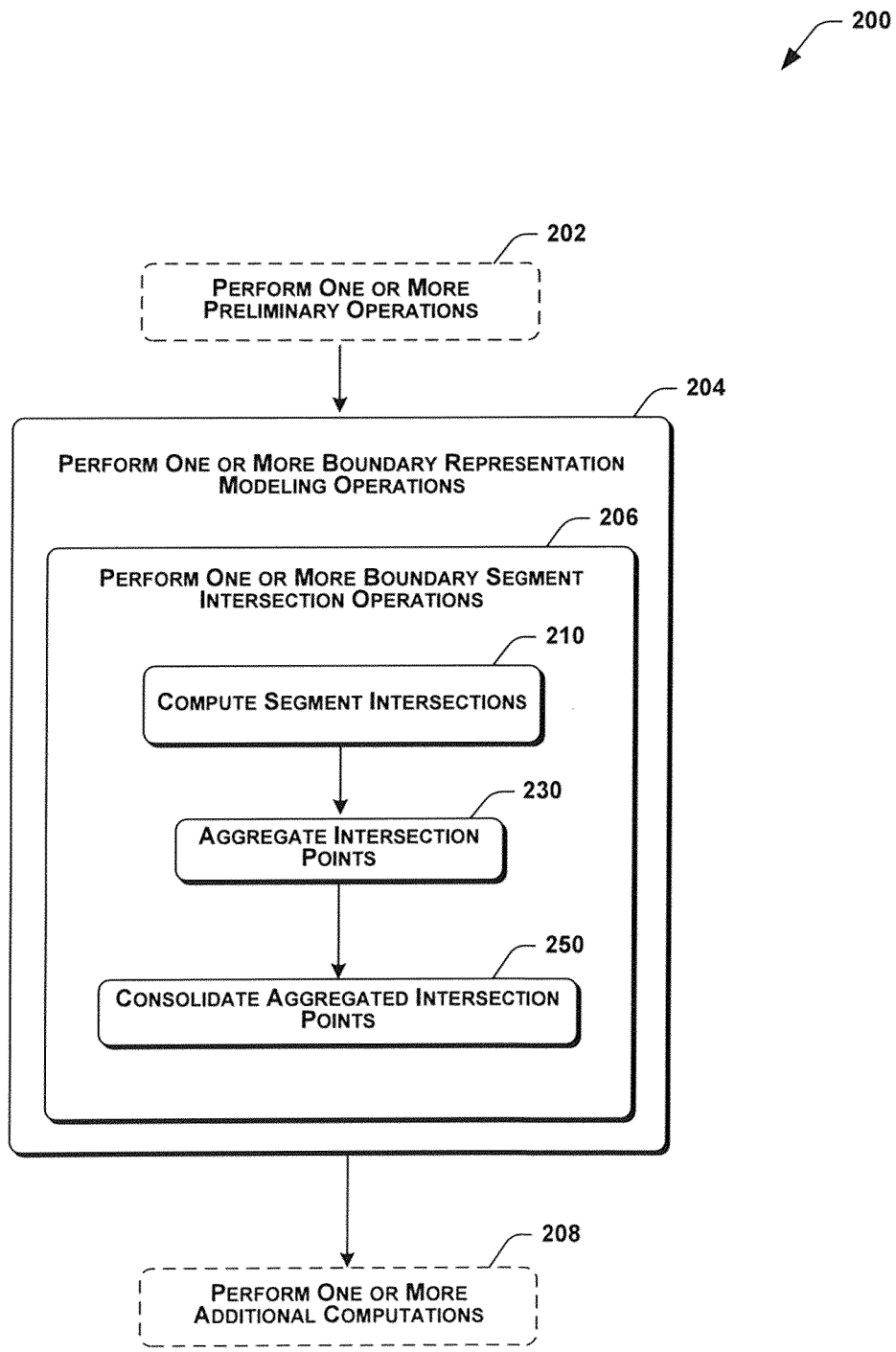
FIG. 2 is a flowchart of an exemplary embodiment of a process in accordance with the teachings of the present disclosure.

FIG. 2 is a flowchart of an exemplary process 200 in accordance with the teachings of the present disclosure. In some embodiments, the process 200 may be a stand-alone process, while in further embodiments the process 200 may be part of a broader simulation or modeling process. For example, in some embodiments, the process 200 may be employed by a system (e.g. boundary representation modeling package 150 of FIG. 1) that is configured to perform computational modeling of objects using boundary representation (e.g. such as a CAD system). Alternately, the process 200 may be performed by a system that is more broadly configured to perform a wider variety of predictions or simulations (e.g. sub-surface imaging, tomography, fluid flow, robotics, CAE system, etc.) based on one or more boundary representation models.

As shown in FIG. 2, in this embodiment, the process 200 may optionally include performing one or more preliminary operations at 202. For example, in some embodiments, one or more preliminary operations may be performed in preparation for performing boundary representation modeling operations. Alternately, the one or more preliminary operations (at 202) may be omitted.

At 204, one or more boundary representation modeling operations are performed. More specifically, the one or more boundary representation modeling operations performed at 204 include performing one or more boundary segment intersection calculations at 206. During the one or more boundary segment intersection calculations (at 206), the above-referenced clauses (orientation clause, non-intersection clause, and finitude clause) are substantially honored. In at least some embodiments, the boundary segment intersection calculations (at 206) generally include computing surface/surface intersections two by two to generate intersection lines (e.g. intersection between two triangles), and computing boundary/boundary intersections two by two to generate singular points (e.g. intersection between two segments). More specifically, in the embodiment shown in FIG. 2, the boundary segment intersection calculations at 206 include computing segment intersections at 210, aggregating intersection points at 230, and consolidating aggregated intersection points at 250. Various aspects of the boundary segment intersection calculations performed at 206 are described more fully below.

The process 200 shown in FIG. 2 may also optionally include performing one or more additional computations (or analyses) using the results of the one or more boundary representation modeling operations at 208. For example, the one or more additional computations may include, for example, performing sub-surface imaging simulations, CAD operations, tomography simulations, fluid flow simulations, robotics simulations, computer-aided engineering (CAE) simulations, or any other suitable computations based on the boundary representation modeling results at 204.

Figure 3:
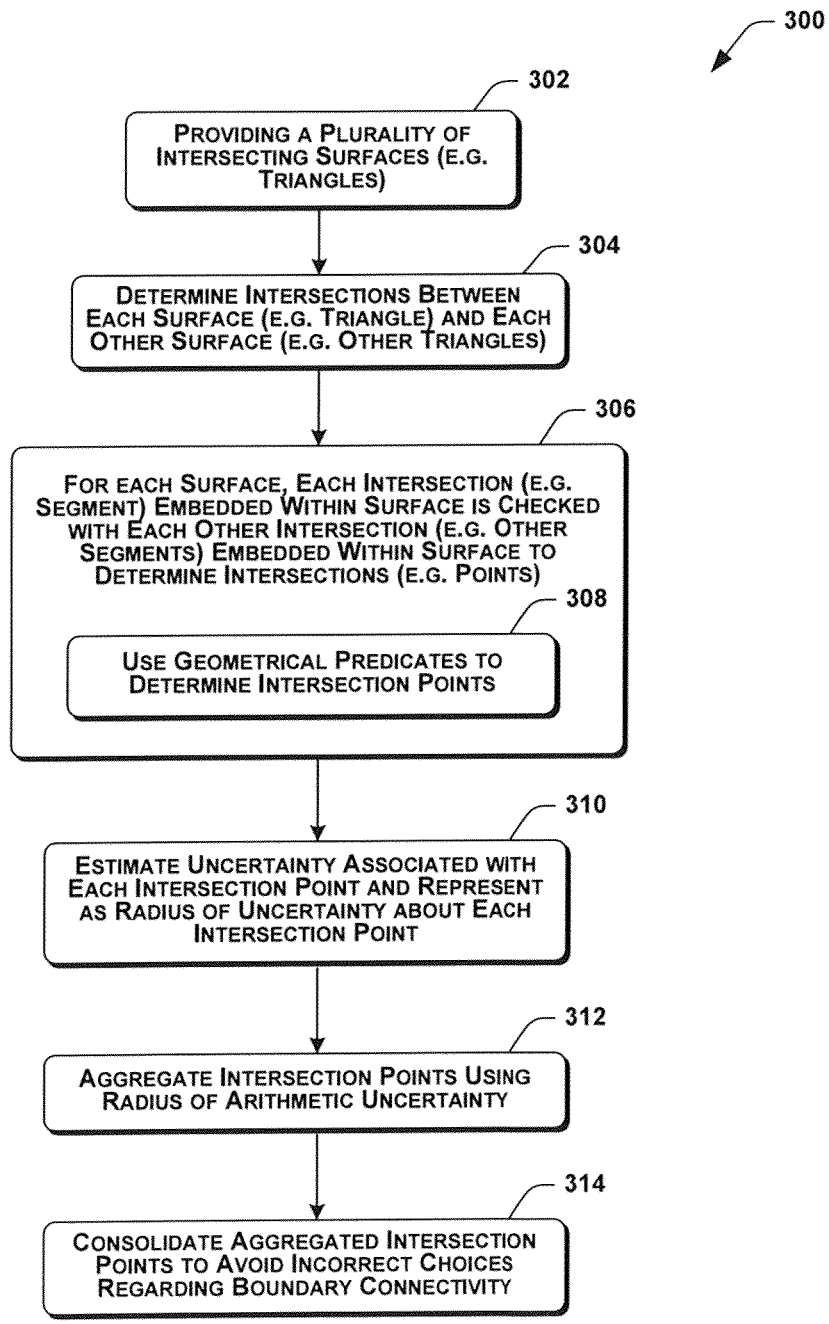
FIG. 3 is a flowchart of another embodiment of a process in accordance with the teachings of the present disclosure.
Figure 5:
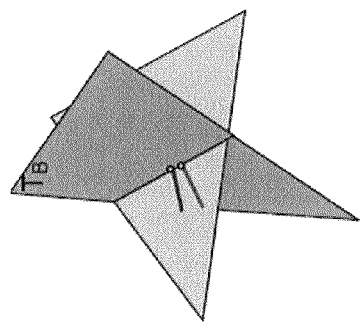
FIGS. 4-7 show exemplary intersecting triangles that illustrate one or more aspects of the process of FIG. 3 in accordance with the teachings of the present disclosure.
Figure 7:
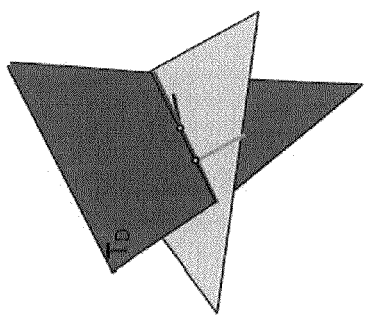
Figure 4:
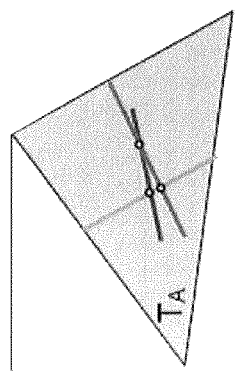
Figure 6:
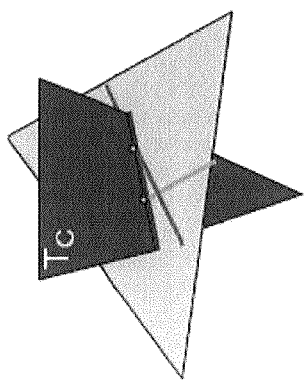

FIG. 3 shows another embodiment of a process 300 in accordance with the teachings of the present disclosure. In this embodiment, the process 300 includes providing a plurality of intersecting surfaces at 302. For example, as a starting point, one may imagine four intersecting triangles coming from four different surfaces named A, B, C, D. FIGS. 4-7 show exemplary intersecting triangles that illustrate one or more aspects of the process 300 of FIG. 3. More specifically, FIG. 4 shows triangle $T_A$, and its intersections with triangle $T_B$ (FIG. 5), with triangle $T_C$ (FIG. 6), and with triangle $T_D$ (FIG. 7).

Referring again to FIG. 3, the individual intersections between each surface and each other surface of the plurality of intersecting surfaces are determined at 304. Using the example of four intersecting triangles (FIGS. 4-7), the determinations at 304 include a series of two by two queries that may be expressed as follows:

Triangle $T_A$ is intersected against triangle $T_B$ and creates a segment $S_{AB}$ Triangle $T_A$ is intersected against triangle $T_c$ and creates a segment $S_{AC}$ Triangle $T_A$ is intersected against triangle $T_D$ and creates a segment $S_{AD}$ Triangle $T_B$ is intersected against triangle $T_A$ and creates a segment $S_{BA}$ (As mathematical queries are organized in a consistent manner, the operations $T_B \cap T_A$ and $T_A \cap T_B$ are identical and lead to the same exact results. This means that $S_{BA}$ is $S_{AB}$.)

Triangle $T_B$ is intersected against triangle $T_C$ and creates a segment $S_{BC}$ Triangle $T_B$ is intersected against triangle $T_D$ and creates a segment $S_{BD}$ These operations are similarly performed with triangle $T_C$ against $\{T_A, T_B, T_D\}$ and with triangle $T_D$ against $\{T_A, T_B, T_C\}$. Thus, for the example of four intersecting triangles shown in FIGS. 4-7, the determinations at 304 result in six segments as shown in Table A below.

TABLE A

| | | |
|---|---|---|
| $\{T_A \cap T_B\} = S_{AB}$ | ⇒ | $\{T_A \cap T_B\} = S_{AB}$ |
| $\{T_A \cap T_C\} = S_{AC}$ | | $\{T_A \cap T_C\} = S_{AC}$ |
| $\{T_A \cap T_D\} = S_{AD}$ | | $\{T_A \cap T_D\} = S_{AD}$ |
| $\{T_B \cap T_C\} = S_{BC}$ | | $\{T_B \cap T_C\} = S_{BC}$ |
| $\{T_B \cap T_D\} = S_{BD}$ | | $\{T_B \cap T_D\} = S_{BD}$ |
| $\{T_B \cap T_A\} = \{T_A \cap T_B\}$ | | $\{T_C \cap T_D\} = S_{CD}$ |
| $\{T_C \cap T_D\} = S_{CD}$ | | |
| $\{T_C \cap T_A\} = \{T_A \cap T_C\}$ | | |
| $\{T_C \cap T_B\} = \{T_B \cap T_C\}$ | | |
| $\{T_D \cap T_A\} = \{T_A \cap T_D\}$ | | |
| $\{T_D \cap T_B\} = \{T_B \cap T_D\}$ | | |
| $\{T_D \cap T_C\} = \{T_C \cap T_D\}$ | | |

With continued reference to FIG. 3, at 306, for each surface, each intersection embedded within the surface is checked with each other intersection embedded within the surface to determine intersections. For the example of the four intersecting triangles $T_A$, $T_B$, $T_C$, $T_D$, the determinations at 306 include, for each triangle, determining the intersections of each of the six segments $S_{AB}$, $S_{AC}$, $S_{AD}$, $S_{BC}$, $S_{BD}$, $S_{CD}$ (which were determined at 304).

More specifically, for triangle $T_A$, the intersections of the three segments $S_{AB}$, $S_{AC}$, $S_{AD}$ embedded in this triangle results in three points $P_{ABC}$, $P_{ABD}$, $P_{ACD}$. These operations may be expressed as follows:

Segment $S_{AB}$ is intersected against segment $S_{AC}$ and produces point $P_{ABC}$ Segment $S_{AB}$ is intersected against segment $S_{AD}$ and produces point $P_{ABD}$ Segment $S_{AC}$ is intersected against segment $S_{AD}$ and produces point $P_{ACD}$ These operations can be repeated for the segments within the other three triangles $T_B$, $T_C$ and $T_D$. Thus, shown in Table B below, the determinations at 306 for the four intersecting triangles shown in FIGS. 4-7 result in nine points $P_{ABC}$, $P_{ABD}$, $P_{ACD}$, $P_{BCD}$, $P_{BCA}$, $P_{BDA}$, $P_{CDA}$, $P_{CDB}$, $P_{ADB}$.

TABLE B

| | | |
|---|---|---|
| $\{S_{AB} \cap S_{AC}\} = P_{ABC}$ | $\{S_{BC} \cap S_{BD}\} = P_{BCD}$ | $\{S_{CD} \cap S_{AD}\} = P_{CDA}$ |
| $\{S_{AB} \cap S_{AD}\} = P_{ABD}$ | $\{S_{BC} \cap S_{AB}\} = P_{BCA}$ | $\{S_{CD} \cap S_{BD}\} = P_{CDB}$ |
| $\{S_{AC} \cap S_{AD}\} = P_{ACD}$ | $\{S_{BD} \cap S_{AB}\} = P_{BDA}$ | $\{S_{AD} \cap S_{BD}\} = P_{ADB}$ |

As further shown in FIG. 3, the determinations at 306 may include using geometrical predicates to determine intersection points at 308. More specifically, one or more geometrical predicates may be used to determine on which side a point along the segment is lying from the half plane defined by the other segment. As used herein, the term "geometrical predicates" includes any suitable numerical tests, including, for example, those numerical tests known as the orientation test and the incircle test. In brief, the orientation test determines whether a point lies to the left of, to the right of, or on a line or plane defined by other points. Similarly, the incircle test determines whether a point lies inside, outside or on a circle defined by other points. Additional details regarding these and other geometrical predicates are described, for example, in the following references: *Adaptive Precision Floating-Point Arithmetic and Fast Robust Geometric Predicates*, by Jonathan Richard Shewchuk, Discrete & Computational Geometry 18:305-363, 1997, and Technical Report CMU-CS-96-140, School of Computer Science, Carnegie Mellon University, Pittsburgh, Pa., May 1996.

Figure 8:
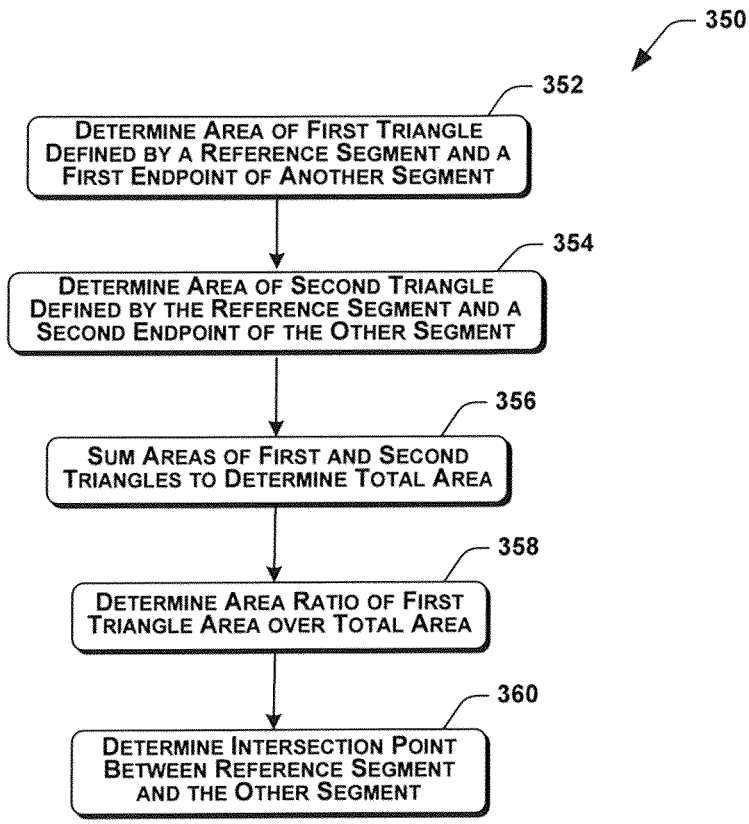
FIG. 8 is a flowchart of an embodiment of a sub-process for using geometrical predicates to determine whether two segments intersect in accordance with the teachings of the present disclosure.
Figures 9, 10:
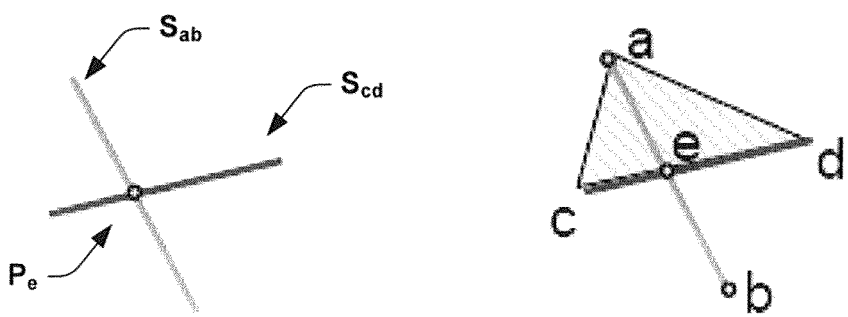
FIGS. 9-10 show exemplary intersecting segments that illustrate one or more aspects of the sub-process of FIG. 8 in accordance with the teachings of the present disclosure.

For example, FIG. 8 is a flowchart of an embodiment of a sub-process 350 for using geometrical predicates to determine where two segments intersect (e.g. as determined at 308 of FIG. 3). FIGS. 9-10 show exemplary intersecting segments $S_{ab}$, $S_{cd}$ that illustrate one or more aspects of using geometrical predicates to determine an intersection point $P_e$ in accordance with the teachings of the present disclosure.

As shown in FIG. 8, at 352, the area of a first triangle defined by a reference segment and a first endpoint of another segment is determined. For example, as shown in FIG. 10, using segment $S_{ab}$ as the reference segment, an $Area_{acd}$ is determined at 352. Similarly, at 354, the area of a second triangle defined by the reference segment and a second endpoint of the other segment is determined. For the example shown in FIG. 10, an $Area_{bdc}$ is determined at 352. The areas of the first and second triangles $Area_{acd}$, $Area_{bdc}$ are then summed at 356 to determine a total area $Area_{acbd}$, and at 358, an area ratio of the first triangular area $Area_{acd}$ (from 352) over the total area $Area_{acbd}$ (from 356) is determined. From the results of these operations 352-358, the location of the intersection point (e.g. point $P_e$ of FIGS. 9 and 10) is determined at 360 using the area ratio and the first and second endpoints of the reference segment in the mathematical formula shown in Table C below.

TABLE C

On which side is lying a to half space (c, d) →Results equal to the area acd
On which side is lying b to half space (c, d) →Results equal to the area bdc
Using as reference segment (a, b), the intersection point e can be computed as follow
e = a + ($Area_{acd}$/$Area_{acbd}$) × (b − a)
As $Area_{acbd}$ = $Area_{acd}$ + $Area_{bdc}$,
the following equation is equivalent to:
e = a × (1 − $Area_{acd}$/$Area_{acbd}$) + b × ($Area_{acd}$/$Area_{acbd}$)
Equivalent to:
e = (a × $Area_{bdc}$ + b × $Area_{acd}$)/($Area_{acd}$ + $Area_{bdc}$)
Using as reference segment (c, d), the intersection point e can be computed as follow
e = (c × $Area_{abd}$ + d × $Area_{acb}$)/($Area_{abd}$ + $Area_{acb}$)

Referring again to FIG. 3, the process 300 further includes estimating an uncertainty associated with each intersection point (determined at 306) and representing the estimated uncertainty as a radius of uncertainty about each intersection point at 310. For example, in some embodiments, the radius may be determined at 310 by performing the following symmetrical operations: [A∩B={PtAB} and B∩A={PtBA}→radius=2×Δ(PtAB, PtBA)]. As consequence, each intersection point can be viewed as a sphere centered on the determined intersection point (determined at 306) with a radius equal to two times the difference between this point and its dual computation.

For those embodiments that use geometric predicates in accordance with the sub-process 350 (shown in FIG. 8), as noted above, the sub-process 350 assumes that a selected segment is used as a reference segment. Due to numerical instabilities (round-offs), however, computation using one segment or the other one as reference could lead to slightly different results. This difference of results may be estimated (e.g. by repeating the sub-process 350 using the other segment as the reference segment and computing the radius using the operations shown above), and represented as a radius of uncertainty around the intersection point (at 310). For alternate embodiments, other suitable techniques for estimating the uncertainties, and thus the radii, associated with the computed intersection points may be used.

At 312, the process 300 shown in FIG. 3 aggregates intersection points using the radius of arithmetic uncertainty associated with each intersection point (determined at 310). More specifically, the aggregation operations at 312 may determine whether two points are sufficiently close to each other to be aggregated (e.g. if their radii of uncertainty touch or overlap), and if so, then they are grouped into the same set. For the example case of four intersecting triangles described above (FIGS. 4-7), the nine intersection points determined above and shown in Table B can be reduced by the aggregation at 312 to only four intersection points, as depicted in the following Table D.

TABLE D

| | | |
|---|---|---|
| $\{S_{AB} \cap S_{AC}\} = P_{ABC}$ | ⇨ | $\{S_{AB} \cap S_{AC}\} = P_{ABC}$ |
| $\{S_{AB} \cap S_{AD}\} = P_{ABD}$ | | $\{S_{AB} \cap S_{AD}\} = P_{ABD}$ |
| $\{S_{AC} \cap S_{AD}\} = P_{ACD}$ | | $\{S_{AC} \cap S_{AD}\} = P_{ACD}$ |
| $\{S_{BC} \cap S_{BD}\} = P_{BCD}$ | | $\{S_{BC} \cap S_{BD}\} = P_{BCD}$ |
| $\{S_{BC} \cap S_{AB}\} = P_{BCA}$ | | $\{S_{BC} \cap S_{AB}\} = \{S_{AB} \cap S_{AC}\}$ |
| $\{S_{BD} \cap S_{AB}\} = P_{BDA}$ | | $\{S_{BD} \cap S_{AB}\} = \{S_{AB} \cap S_{AD}\}$ |
| $\{S_{CD} \cap S_{AD}\} = P_{CDA}$ | | $\{S_{CD} \cap S_{AD}\} = \{S_{AC} \cap S_{AD}\}$ |
| $\{S_{CD} \cap S_{BD}\} = P_{CDB}$ | | $\{S_{CD} \cap S_{BD}\} = \{S_{BC} \cap S_{BD}\}$ |
| $\{S_{AD} \cap S_{BD}\} = P_{ADB}$ | | $\{S_{AD} \cap S_{BD}\} = \{S_{AB} \cap S_{AD}\}$ |

Referring again to FIG. 3, at 314, the process 300 includes consolidating aggregated intersection points using geometrical predicates and topological information in order to avoid any incorrect choices being made regarding boundary connectivity. The consolidating at 314 may best be understood by considering the following example. Imagine that the sphere of uncertainty associated to point $P_{ABC}$ is containing the point $P_{ABD}$ but does not contain the point $P_{ACD}$. This means that $P_{ABC}$ and $P_{ABD}$ are being aggregated into the same entity during aggregation operations at 312. However, $P_{ACD}$ will be left alone. Ignoring $P_{ACD}$ will be an incorrect choice and will invalidate segment connectivity, breaking one or more of the mathematical clauses introduced previously. Topological consistency here will be enforced by the consolidation of aggregated intersection points at 314.

The consolidation of aggregated intersection points at 314 may use logical set operations (combinatorial) to determine if some points left over by the geometrical aggregation (at 312) should be grouped. In some embodiments, the consolidation operations at 314 may use the mathematical expressions provided in Table E below.

TABLE E

Step 1: Agregation step has created three groups:
Group a $\{P_{ABC}, P_{ABD}\}$
Group b $\{P_{ACD}\}$
Group c $\{P_{BCD}\}$
Step 2: By decomposing group a, you can determine that group b has to be merged with group a
Group a $\{P_{ABC}, P_{ABD}\} \to \{S_{AB} \cap S_{AC}\} \cup \{S_{AB} \cap S_{AD}\}$
which imply that $S_{AC} \cap S_{AD}$ which is equal to $P_{ACD}$
You also know that $P_{ABC}$ is equal to $P_{BCA}$ and that $P_{ABD}$ is equal to $P_{BDA}$, which means that group a can be expressed as follow:
Group a $\{P_{ABC}, P_{ABD}, P_{ACD}\} \to \{S_{AB} \cap S_{AC}\} \cup \{S_{AB} \cap S_{AD}\} \cup \{S_{AC} \cap S_{AD}\} \cup \{S_{BC} \cap S_{AB}\} \cup \{S_B \cap S_{AB}\}$
which imply that $\{S_{BC} \cap S_{BD}\}$ which is equal to $P_{BCD}$
Step 3: Only one group is remaining ensuring topological consistency is preserved
Group a $\{P_{ABC}, P_{ABD}, P_{ACD}, P_{BCD}\}$ It will be appreciated that embodiments of methods and systems for precise boundary segment intersection in accordance with the teachings of the present disclosure may provide considerable advantages over conventional processes. For example, in the field of fossil fuel production, such embodiments may provide improved "watertight" models for reservoir modeling activities (e.g. using PETREL® computer software), and may reduce or eliminate the need for backup solutions for sub-salt imaging activities. Such embodiments may also improve the correctness of complex boundary representation models used in a wide variety of technical disciplines (e.g. depth imaging, ray tracing, tomography, CAD, etc.). Therefore, embodiments in accordance with the present disclosure may advantageously improve a multitude of analytical activities in the fields of engineering analysis, computer graphics, animation, rapid prototyping, medical testing, product visualization, visualization of scientific research, and other suitable fields.

In general, unless otherwise stated herein, one or more of the components (or portions) of the systems and methods disclosed herein may be variously combined with one or more other components (or portions), or eliminated, to provide further embodiments in accordance with the teachings of the present disclosure. Also, it will be appreciated that, unless otherwise stated herein, one or more of the components of the systems and methods disclosed herein may include (or be composed of) conventional components.

Although embodiments of methods and systems for precise boundary segment intersection in accordance with the teachings of the present disclosure have been described in language specific to structural features and/or methods, it is to be understood that the subject of the appended claims is not necessarily limited to the specific features or methods described above. Rather, the specific features and methods are disclosed as exemplary implementations to provide an understanding of such embodiments, and to provide support for the claims that follow.

What is claimed is:

1. A method, comprising: computing, using one or more processors, a plurality of intersections of a plurality of segments; computing an uncertainty associated with each intersection of the plurality of intersections; determining whether to aggregate at least one of the plurality of intersections with another of the plurality of intersections based on one or more of the determined uncertainties; and for at least one intersection that was determined to not be aggregated with another of the plurality of intersections based on the determined uncertainties, determining whether to consolidate the at least one non-aggregated intersection with at least one other intersection of the plurality of intersections based on a topological consistency requirement, wherein determining whether to consolidate the at least one non-aggregated intersection with at least one other intersection of the plurality of intersections based on the topological consistency requirement includes: determining whether consolidating the at least one non-aggregated intersection with the at least one other intersection violates the topological consistency requirement, wherein the topological consistency requirement comprises an orientation clause, a non-intersection clause, and a finitude clause, each of the orientation clause, non-intersection clause, and the finitude clauses being associated at least with edges of volumes associated with the plurality of segment.

2. The method of claim 1, wherein determining whether to consolidate the at least one non-aggregated intersection with at least one other intersection of the plurality of intersections based on the topological consistency requirement includes:
determining whether to consolidate the at least one non-aggregated intersection with at least one other intersection of the plurality of intersections based on at least one of a geometrical predicate or a topological information.

3. The method of claim 1, wherein each of the plurality of segments represents an intersection of at least two surfaces.

4. The method of claim 1, wherein computing the plurality of intersections of the plurality of segments includes using one or more geometrical predicates.

5. The method of claim 1, further comprising:
aggregating the at least one of the plurality of intersections with the another of the plurality of intersections after determining whether to aggregate, wherein aggregating comprises treating the at least one of the plurality of intersections and the another of the plurality of intersections as a single intersection.

6. The method of claim 1, wherein computing the plurality of intersections of the plurality of segments includes:
selecting a reference segment from among the plurality of segments;
determining an area of a first triangle defined by the reference segment and a first endpoint of a second one of the plurality of segments;
determining an area of a second triangle defined by the reference segment and a second endpoint of the second one of the plurality of segments;
determining an area ratio as the area of the first triangle over a sum of the areas of the first and second triangles; and
determining an intersection point between the reference segment and the second one of the plurality of segments using the area ratio and the first and second endpoints of the reference segment.

7. The method of claim 6, wherein computing the uncertainty associated with each intersection of the plurality of intersections includes:
selecting the second one of the plurality of segments to be an alternate reference segment;
determining an area of a first alternate triangle defined by the alternate reference segment and a first endpoint of a third one of the plurality of segments;
determining an area of a second alternate triangle defined by the alternate reference segment and a second endpoint of the third one of the plurality of segments;
determining an alternate area ratio as the area of the first alternate triangle over a sum of the areas of the first and second alternate triangles;
determining an alternate intersection point between the alternate reference segment and the third one of the plurality of segments using the alternate area ratio and the first and second endpoints of the alternate reference segment; and
estimating the uncertainty based at least partially on a difference between the intersection point and the revised intersection point.

8. A method, comprising:
computing, using one or more processors, a plurality of intersections of a plurality of segments;
computing an uncertainty associated with each intersection of the plurality of intersections; and
determining whether to aggregate at least one of the plurality of intersections with another of the plurality of intersections based on one or more of the determined uncertainties,
wherein computing the uncertainty associated with each intersection of the plurality of intersections includes:
estimating the uncertainty based at least partially on a difference between each determined intersection point and an alternate intersection point resulting from a determination of the intersection of the same segments determined in an alternate way.

9. One or more non-transitory computer-readable media containing instructions that, when executed by a computer, perform a method comprising:
determining a plurality of segments, each segment corresponding to an intersection of a plurality of surfaces;
calculating a plurality of intersections between the plurality of segments;
calculating a radius of uncertainty centered at each intersection of the plurality of intersections;
aggregating at least one of the plurality of intersections with another of the plurality of intersections based on one or more of the calculated radii of uncertainty, wherein aggregating comprises treating the at least one of the plurality of intersections and the another of the plurality of intersections as a single intersection; and
for at least one intersection that was not aggregated with another of the plurality of intersections based on the determined uncertainties, consolidating the at least one non-aggregated intersection with at least one other intersection of the plurality of intersections based on a topological consistency requirement.

10. The one or more computer-readable media of claim 9, wherein calculating the plurality of intersections between the plurality of segments includes using one or more geometrical predicates.

11. The one or more computer-readable media of claim 9, wherein calculating the plurality of intersections between the plurality of segments includes:
selecting a reference segment from among the plurality of segments;
determining an area of a first triangle defined by the reference segment and a first endpoint of a second one of the plurality of segments;
determining an area of a second triangle defined by the reference segment and a second endpoint of the second one of the plurality of segments;
determining an area ratio as the area of the first triangle over a sum of the areas of the first and second triangles; and
determining an intersection point between the reference segment and the second one of the plurality of segments using the area ratio and the first and second endpoints of the reference segment.

12. The one or more computer-readable media of claim 9, wherein calculating the radius of uncertainty associated with each intersection of the plurality of intersections includes:
for each calculated intersection, calculating an alternate intersection using an alternate calculation that is different from the calculating of the plurality of intersections between the plurality of segments; and
calculating the radius of uncertainty based on a difference between each calculated intersection and each alternately calculated intersection.

* * * * *